(12) United States Patent
Oe et al.

(10) Patent No.: US 10,277,133 B2
(45) Date of Patent: Apr. 30, 2019

(54) ISOLATED DC/DC CONVERTER, PRIMARY SIDE CONTROLLER, POWER ADAPTER, AND ELECTRONIC DEVICE

(71) Applicant: ROHM CO., LTD., Ukyo-ku, Kyoto (JP)

(72) Inventors: Takumi Oe, Kyoto (JP); Hiroyuki Murakami, Kyoto (JP); Hiroki Kikuchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/830,461

(22) Filed: Dec. 4, 2017

(65) Prior Publication Data

US 2018/0159433 A1    Jun. 7, 2018

(30) Foreign Application Priority Data

Dec. 6, 2016   (JP) ................................. 2016-236447

(51) Int. Cl.
*H02M 3/335*   (2006.01)
*H02M 1/14*    (2006.01)
*H02M 1/08*    (2006.01)
*H02M 1/00*    (2006.01)

(52) U.S. Cl.
CPC ......... *H02M 3/33523* (2013.01); *H02M 1/08* (2013.01); *H02M 1/143* (2013.01); *H02M 2001/0048* (2013.01); *Y02B 70/1491* (2013.01)

(58) Field of Classification Search
CPC . H02M 2001/0003; H02M 2001/0009; H02M 2001/0048; H02M 1/08; H02M 1/14; H02M 1/143; H02M 3/335; H02M 3/33523; H02M 3/3338; H02M 3/3353; H02M 3/337
See application file for complete search history.

(56) References Cited

U.S. PATENT DOCUMENTS

| | | | | |
|---|---|---|---|---|
| 2011/0103101 A1* | 5/2011 | Hiasa | ................ | H02M 3/33507 363/21.12 |
| 2015/0180353 A1* | 6/2015 | Tsai | .................. | H02M 3/33515 363/21.01 |
| 2017/0338746 A1* | 11/2017 | Chen | ....................... | H02M 1/08 |

FOREIGN PATENT DOCUMENTS

| | | | | | |
|---|---|---|---|---|---|
| JP | | 2005204458 A | * | 7/2005 | |
| JP | | 2009153234 A | | 7/2009 | |
| WO | WO-2012070512 A1 | * | 5/2012 | ........ H02M 3/33523 |

* cited by examiner

*Primary Examiner* — Timothy J. Dole
*Assistant Examiner* — Shahzeb A Ahmad
(74) *Attorney, Agent, or Firm* — Cantor Colburn LLP

(57) ABSTRACT

An isolated DC/DC converter includes a transformer having a first winding and a secondary winding, a switching transistor connected to the primary winding of the transformer, a rectifier element connected to the secondary winding of the transformer, a photocoupler, a feedback circuit configured to drive a light emitting element on an input side of the photocoupler by a forward current corresponding to an error between an output voltage of the DC/DC converter and a target voltage of the DC/DC converter, a conversion circuit configured to convert a collector current flowing in a light receiving element on an output side of the photocoupler into a feedback voltage having a negative correlation with the collector current, a pulse signal generator configured to generate a pulse signal corresponding to the feedback voltage, and a driver configured to drive the switching transistor depending on the pulse signal.

20 Claims, 19 Drawing Sheets

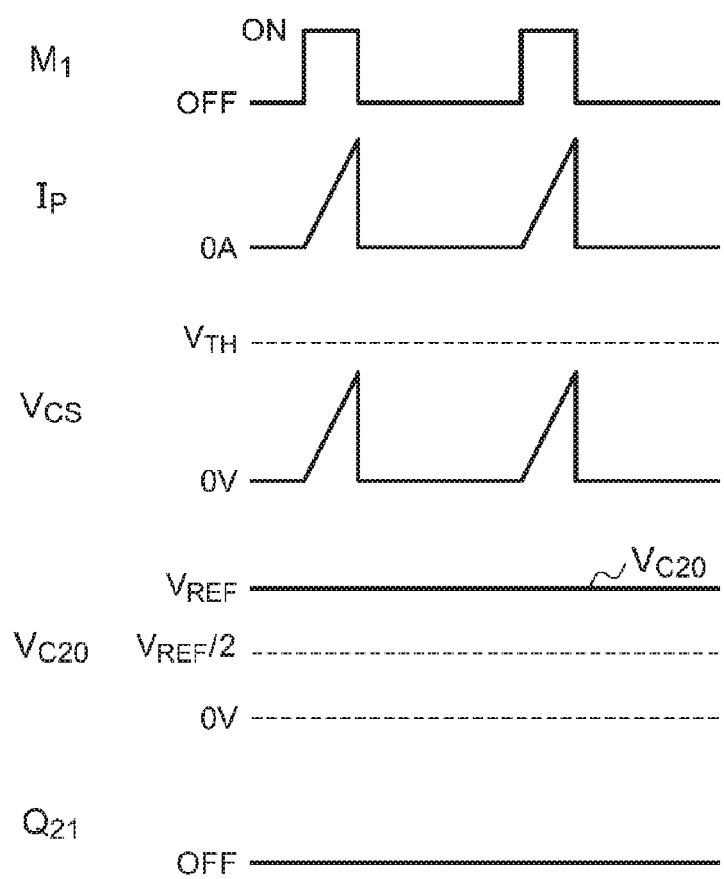

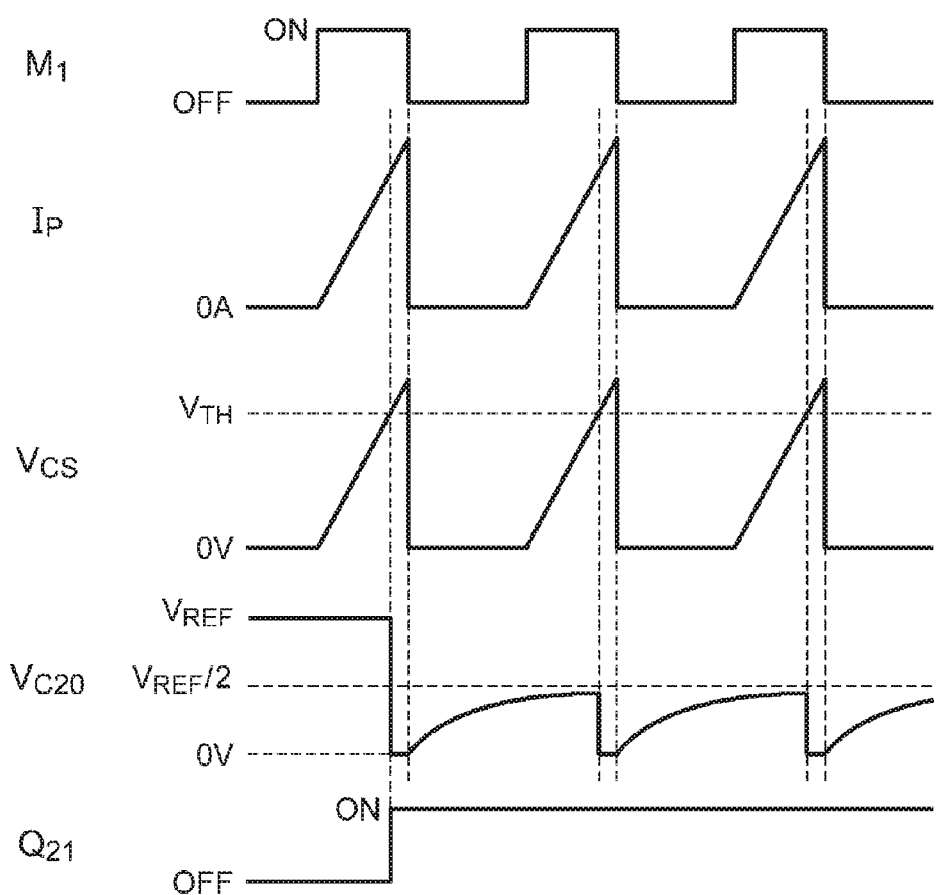

ISOLATED DC/DC CONVERTER, PRIMARY SIDE CONTROLLER, POWER ADAPTER, AND ELECTRONIC DEVICE

CROSS-REFERENCE TO RELATED APPLICATION(S)

This application is based upon and claims the benefit of priority from Japanese Patent Application No. 2016-236447, filed on Dec. 6, 2016, the entire contents of which are incorporated herein by reference.

TECHNICAL FIELD

The present disclosure relates to a DC/DC converter.

BACKGROUND

A flyback-type DC/DC converter is used for various power supply circuits such as an AC/DC converter. FIG. 1 is a block diagram illustrating a basic configuration of an AC/DC converter 100R reviewed by the present inventors. The AC/DC converter 100R mainly includes a filter 102, a rectifier circuit 104, a smoothing capacitor 106, and a DC/DC converter 201.

A commercial AC voltage $V_{AC}$ is input to the filter 102 via a fuse and an input capacitor (not shown). The filter 102 removes noise of the commercial AC voltage $V_{AC}$. The rectifier circuit 104 is a diode bridge circuit that full-wave rectifies the commercial AC voltage $V_{AC}$. An output voltage of the rectifier circuit 104 is converted into a DC voltage $V_{IN}$, which is smoothed by the smoothing capacitor 106.

The isolated DC/DC converter 201 receives the DC voltage $V_{IN}$ at an input terminal $P_1$, steps down the same, and supplies an output voltage $V_{OUT}$, which is stabilized to a target value, to a load (not shown) connected to an output terminal $P_2$. The DC/DC converter 201 includes a primary side controller 202, a photocoupler 204, a shunt regulator 206, an output circuit 210, and other circuit components. The output circuit 210 includes a transformer $T_1$, a diode $D_1$, an output capacitor $C_1$, and a switching transistor $M_1$. The topology of the output circuit 210 is that of a typical flyback converter.

As the switching transistor $M_1$ connected to a primary winding $W_1$ of the transformer $T_1$ is switched, the input voltage $V_{IN}$ is stepped down and the output voltage $V_{OUT}$ is generated. Then, the primary side controller 202 stabilizes the output voltage $V_{OUT}$ to the target value by adjusting a switching duty ratio of the switching transistor $M_1$.

The output voltage $V_{OUT}$ of the DC/DC converter 201 is divided by resistors $R_{11}$ and $R_{12}$. The shunt regulator 206 amplifies an error between the divided voltage (voltage detection signal) $V_S$ and a predetermined reference voltage $V_{REF}$ (not shown) which is internally set, and draws a forward current $I_F$ corresponding to the error from a light emitting element (light emitting diode) of an input side of the photocoupler 204 (sink).

A collector current $I_C$ corresponding to the forward current $I_F$ flows through a light receiving element (phototransistor) of an output side of the photocoupler 204. The collector current $I_C$ (feedback current $I_{FB}$) is input to a feedback (FB) terminal of the primary side controller 202. A feedback voltage $V_{FB}$ having a negative correlation with the collector current $I_C$ is generated at the FB terminal. The primary side controller 202 switches the switching transistor $M_1$ with a duty ratio corresponding to the feedback voltage $V_{FB}$.

An output current $I_{OUT}$ of the DC/DC converter 201 varies depending on a state of the load. When the output current $I_{OUT}$ decreases while the switching transistor $M_1$ is switched at a certain duty ratio, the output voltage $V_{OUT}$ rises. Then, since the forward current $I_F$ and the collector current $I_C$ increase and the feedback voltage $V_{FB}$ decreases, the duty ratio of the switching transistor $M_1$ decreases and the current supply to the output capacitor $C_1$ decreases to suppress the rise of the output voltage $V_{OUT}$.

On the contrary, when the output current $I_{OUT}$ increases at a state that the duty ratio of the switching transistor $M_1$ is constant, the output voltage $V_{OUT}$ decreases. Since the forward current $I_F$ and the collector current $I_C$ decrease and the feedback voltage $V_{FB}$ rises, the duty ratio of the switching transistor $M_1$ increases and the current supply to the output capacitor $C_1$ increases, so that the decrease of the output voltage $V_{OUT}$ is suppressed.

FIG. 2 illustrates a relationship between the output current $I_{OUT}$ and the collector current $I_C$. Here, for simplicity of explanation, it is assumed that the conversion efficiency (gain) of the photocoupler 204 is 100% ($I_C/I_F \approx 1$).

As described above, the collector current $I_C$ decreases in a light load state where the output current $I_{OUT}$ is small, and increases in a heavy load state where the output current $I_{OUT}$ is large. An operating point of the circuit should be determined in consideration of the stability of the circuit. For example, as indicated by the solid line, if the collector current $I_C$=0.5 mA is optimum at a rated current $I_{OUT}=I_{RATE}$, the collector current $I_C$ rises to about 1 mA in the light load state ($I_{OUT} \approx 0$ mA). Assuming that $I_C=I_F=1$ mA and $V_{OUT}=24$ V, the power consumption on the secondary side is 24 mW.

Due to the recent demand for energy savings, the reduction in power consumption of the light load or no-load state (also referred to as a standby state) is required, specifically a standby power of 100 mW or less is required in the entire AC/DC converter 100R. If the power consumption of 24 mW occurs on the secondary side of the DC/DC converter 201, it becomes difficult to suppress the AC/DC converter 100R as a whole to 100 mW or less.

It is assumed that the operating point of the circuit is determined such that the collector current $I_C$ in the light load state ($I_{OUT} \approx 0$ mA) is, for example, 0.5 mA, as indicated by the alternate long and short dash line in FIG. 2. In this case, if the conversion efficiency of the photocoupler 204 is maintained at 100%, since the $I_C=I_F=0.5$ mA, the power consumption on the secondary side can be reduced to 12 mW but the proportion of the power consumption still exceeds 10% of the allowable power consumption of 100 mW.

When the output current $I_{OUT}$ increases up to the rated current $I_{RATE}$ according to the alternate long and short dash line, the collector current $I_C$ decreases up to, for example, 0.25 mA. Although the conversion efficiency of the photocoupler 204 has temperature dependency, the temperature dependency increases as the operating current decreases. Therefore, if the operating point is determined as indicated by the alternate long and short dash line, the gain of the feedback loop greatly fluctuates due to the temperature fluctuation, and the stability of the system degrades.

From the above, it is actually difficult to set the operating point such that the collector current $I_C$ decreases as indicated by the alternate long and short dash line.

SUMMARY

Some embodiments of the present disclosure provide a DC-DC converter capable of reducing power consumption at a light load.

According to one embodiment of the present disclosure, there is provided an isolated DC/DC converter. The isolated DC/DC converter includes a transformer having a first winding and a secondary winding, a switching transistor connected to the primary winding of the transformer, a rectifier element connected to the secondary winding of the transformer, a photocoupler, a feedback circuit configured to drive a light emitting element on an input side of the photocoupler by a forward current corresponding to an error between an output voltage of the DC/DC converter and a target voltage of the DC/DC converter, a conversion circuit configured to convert a collector current flowing in a light receiving element on an output side of the photocoupler into a feedback voltage having a negative correlation with the collector current, a pulse signal generator configured to generate a pulse signal corresponding to the feedback voltage, and a driver configured to drive the switching transistor depending on the pulse signal. The conversion circuit is configured to change conversion characteristics from the collector current to the feedback voltage based on an output current of the DC/DC converter.

In a light load state, the conversion characteristics can be determined such that a forward current on the input side of the photocoupler becomes small, and in a heavy load state, the power consumption can be reduced. In addition, in the heavy load state, the conversion characteristics can be determined such that the forward current on the input side of the photocoupler is increased, and the stability of the circuit can be improved in the heavy load state.

The DC/DC converter further includes a current sense resistor installed in series with the switching transistor. The conversion characteristics can be controlled based on a voltage drop of the current sense resistor. The output current can also be detected based on the voltage drop of the current sense resistor.

The DC/DC converter further includes a load monitoring circuit including a first comparator configured to compare the voltage drop of the current sense resistor with a threshold value, the load monitoring circuit being configured to control the conversion characteristics depending on an output of the first comparator.

The load monitoring circuit further includes a timer circuit whose output is changed for a certain period of time using an output of the first comparator as a trigger. The load monitoring circuit is configured to control the conversion characteristics depending on the output of the timer circuit.

The timer circuit includes a capacitor connected to the output of the first comparator, a resistor or a current source configured to charge the capacitor, and a second comparator configured to compare a voltage of the capacitor with a determination reference value. The conversion characteristics are controlled depending on an output of the second comparator.

An emitter of the light receiving element of the photocoupler is grounded. The conversion circuit includes a variable impedance circuit installed between a collector of the light receiving element of the photocoupler and a reference voltage line. The conversion circuit is configured such that impedance of the variable impedance circuit is variable depending on the output current.

When the collector current is $I_C$, the voltage of the reference voltage line is $V_{REF}$, and the impedance of the variable impedance circuit is Z, the feedback voltage $V_{FB}$ is expressed by Eq. (1).

$$V_{FB}=V_{REF}-Z \times I_C \qquad \text{Eq. (1)}$$

Therefore, the conversion characteristics may be set based on the impedance Z.

The variable impedance circuit includes a first resistor installed between the collector of the light receiving element of the photocoupler and the reference voltage line, and a second resistor and a switch installed in series between both ends of the first resistor. The variable impedance circuit is configured such that ON/OFF of the switch is switchable depending on the output current.

The conversion circuit includes a feedback terminal at which the feedback voltage is generated, a resistor installed between the feedback terminal and the reference voltage line, a first transistor whose collector/drain is connected to the feedback terminal, emitter/source is grounded, and base/gate is connected to the emitter of the light receiving element of the photocoupler, and a variable impedance circuit installed between the base-gate of the first transistor and the ground.

It is assumed that the current flowing in the first transistor $Q_{31}$ is $I_{FB}$, and the resistance value of the resistor $R_{31}$ is R. At this time, the feedback voltage $V_{FB}$ is expressed by Eq. (2).

$$V_{FB}=V_{REF}-R \times I_{FB} \qquad \text{Eq. (2)}$$

When the impedance of the variable impedance circuit 260 is Z, the base voltage (or gate voltage) $V_{BE}$ of the first transistor $Q_{31}$ is expressed by Eq. (3).

$$V_{BE} \approx I_C \times Z \qquad \text{Eq. (3)}$$

When the mutual conductance of the first transistor $Q_{31}$ is written as gm, Eq. (4) is obtained.

$$I_{FB}=V_{BE} \times gm \qquad \text{Eq. (4)}$$

Eq. (5) is obtained from Eqs. (2) to (4).

$$V_{FB}=V_{REF}-R \times I_C \times Z \times gm \qquad \text{Eq. (5)}$$

In this manner, when the impedance Z of the variable impedance circuit is changed, the slope of the conversion characteristics from the collector current $I_C$ to the feedback voltage $V_{FB}$ can be changed.

Assuming that the collector current is $I_C$, the correction current is $I_{CMP}$, and the current amplification factor of the first transistor is $\beta$, the feedback current $I_{FB}$ is expressed by Eq. (6).

$$I_{FB}=\beta \times (I_C-I_{CMP}) \qquad \text{Eq. (6)}$$

Therefore, the conversion characteristics from the collector current $I_C$ to the feedback voltage $V_{FB}$ is expressed by Eq. (7).

$$V_{FB}=V_{REF}-R \times \beta \times (I_C-I_{CMP}) \qquad \text{Eq. (7)}$$

That is, the conversion characteristics can be controlled depending on the correction current $I_{CMP}$.

The transformer may further include an auxiliary winding installed on the primary side. The DC/DC converter may further include an auxiliary power supply circuit configured to rectify and smooth the current flowing in the auxiliary winding to generate a power source voltage, and a current sense resistor installed in series with the switching transistor.

The conversion characteristics may be discretely changed based on a comparison result between the output current and at least one threshold value. The conversion characteristics may be continuously changed depending on the output current.

According to another embodiment of the present disclosure, there is provided a primary side controller for use in an isolated DC/DC converter. The DC/DC converter includes a transformer having a first winding and a secondary winding, a switching transistor connected to the primary winding of the transformer, a rectifier element connected to the secondary winding of the transformer, a photocoupler, and a feedback circuit configured to drive a light emitting element on an input side of the photocoupler by a forward current corresponding to an error between an output voltage of the DC/DC converter and a target voltage of the DC/DC converter. The primary side controller includes a conversion circuit configured to convert a collector current flowing in a light receiving element on an output side of the photocoupler into a feedback voltage having a negative correlation with the collector current, a pulse signal generator configured to generate a pulse signal corresponding to the feedback voltage, and a driver configured to drive the switching transistor depending on the pulse signal. The conversion circuit is configured to change conversion characteristics from the collector current to the feedback voltage based on an output current of the DC/DC converter.

The conversion characteristics can be determined such that the forward current on the input side of the photocoupler becomes small in a light load state, and the forward current on the input side of the photocoupler become large in a heavy load state. Thus, the power consumption can be reduced in the light load state and the stability of the circuit can be improved in the heavy load state.

The DC/DC converter further includes a current sense resistor installed in series with the switching transistor. The conversion characteristics may be controlled based on a voltage drop of the current sense resistor.

The primary side controller further includes a load monitoring circuit including a first comparator configured to compare the voltage drop of the current sense resistor with a threshold value, the load monitoring circuit being configured to control the conversion characteristics depending on an output of the first comparator.

The load monitoring circuit further includes a timer circuit whose output is changed for a certain period of time using an output of the first comparator as a trigger and the conversion characteristics are controlled depending on an output of the timer circuit.

The timer circuit includes a capacitor connected to the output of the first comparator, a resistor or a current source configured to charge the capacitor, and a second comparator configured to compare a voltage of the capacitor with a determination reference value, wherein the conversion characteristics are controlled depending on an output of the second comparator.

An emitter of the light receiving element of the photocoupler is grounded. The conversion circuit includes a variable impedance circuit installed between a collector of the light receiving element of the photocoupler and a reference voltage line, and the conversion circuit is configured such that impedance of the variable impedance circuit is variable depending on the output current.

The variable impedance circuit includes a first resistor installed between the collector of the light receiving element of the photocoupler and the reference voltage line, and a second resistor and a switch installed in series between both ends of the first resistor. The variable impedance circuit is configured such that ON/OFF of the switch is switchable depending on the output current.

The primary side controller is integrated on a single semiconductor substrate. The "integration" includes a case of forming all of the constituent elements of the circuit on the semiconductor substrate, or a case of integrating the main constituent elements of the circuit. A part of resistors, capacitors or the like may be installed outside the semiconductor substrate for adjusting a circuit constant. As the circuit is integrated in a single chip, a circuit area can be reduced and the characteristics of the circuit elements can be kept uniform.

According to another embodiment of the present disclosure, there is provided an isolated DC/DC converter. The DC/DC converter includes the aforementioned primary side controller.

According to another embodiment of the present disclosure, there is provided an electronic device. The electronic device includes a load, a diode rectifier circuit configured to full-wave rectify a commercial AC voltage, a smoothing capacitor configured to smooth an output voltage of the diode rectifier circuit to generate a DC input voltage, and the aforementioned DC/DC converter configured to step down the DC input voltage for supply to the load.

According to another embodiment of the present disclosure, there is provided a power adaptor. The power adaptor includes a diode rectifier circuit configured to full-wave rectify a commercial AC voltage, a smoothing capacitor configured to smooth an output voltage of the diode rectifier circuit to generate a DC input voltage, and the aforementioned DC/DC converter configured to step down the DC input voltage for supply to a load.

BRIEF DESCRIPTION OF DRAWINGS

FIGS. 9A and 9B are operational waveform diagrams of a conversion circuit 220A in FIG. 8A.

DETAILED DESCRIPTION

Figure 1:
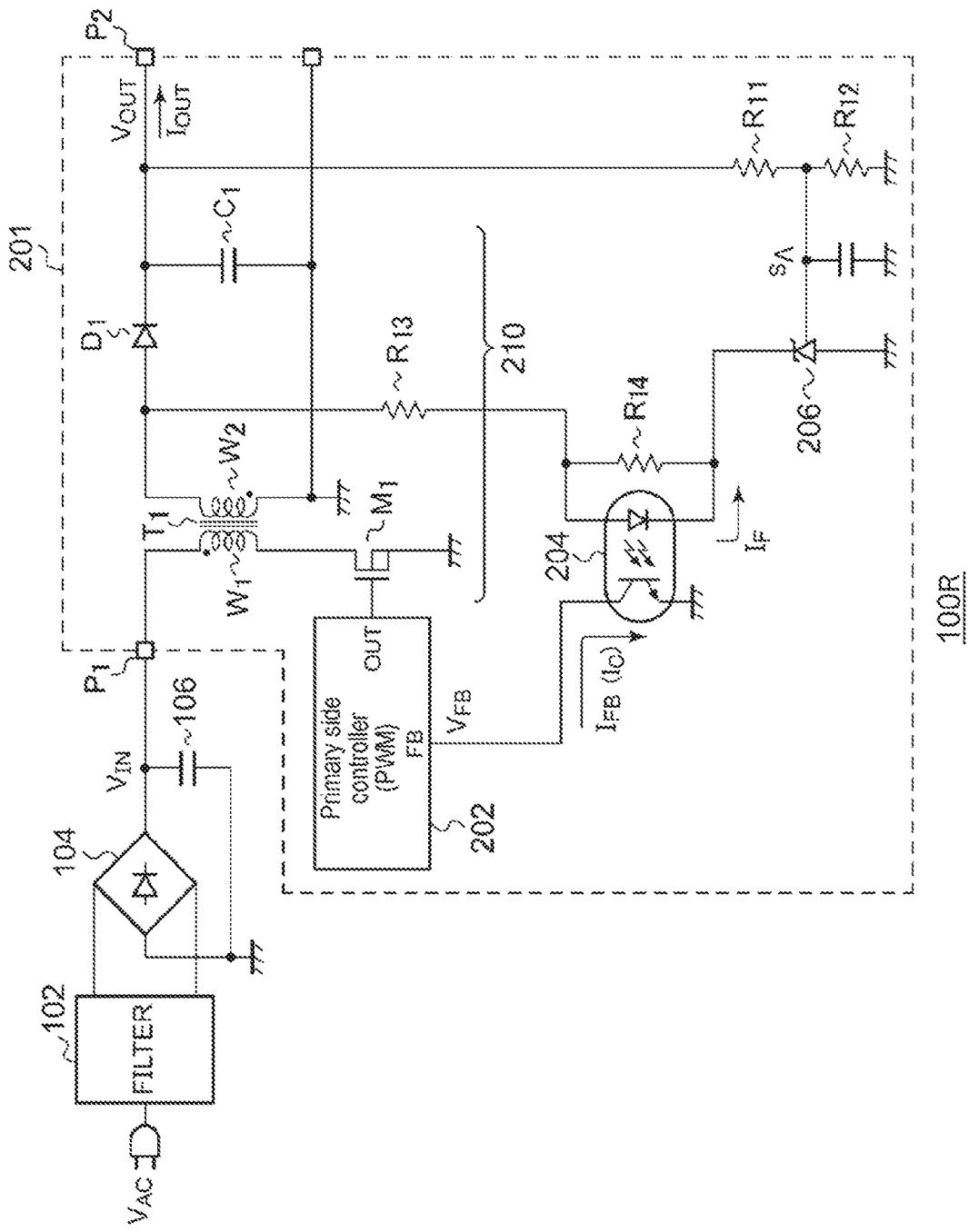
FIG. 1 is a block diagram illustrating a basic configuration of an AC/DC converter reviewed by the present inventor.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure. "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 3:
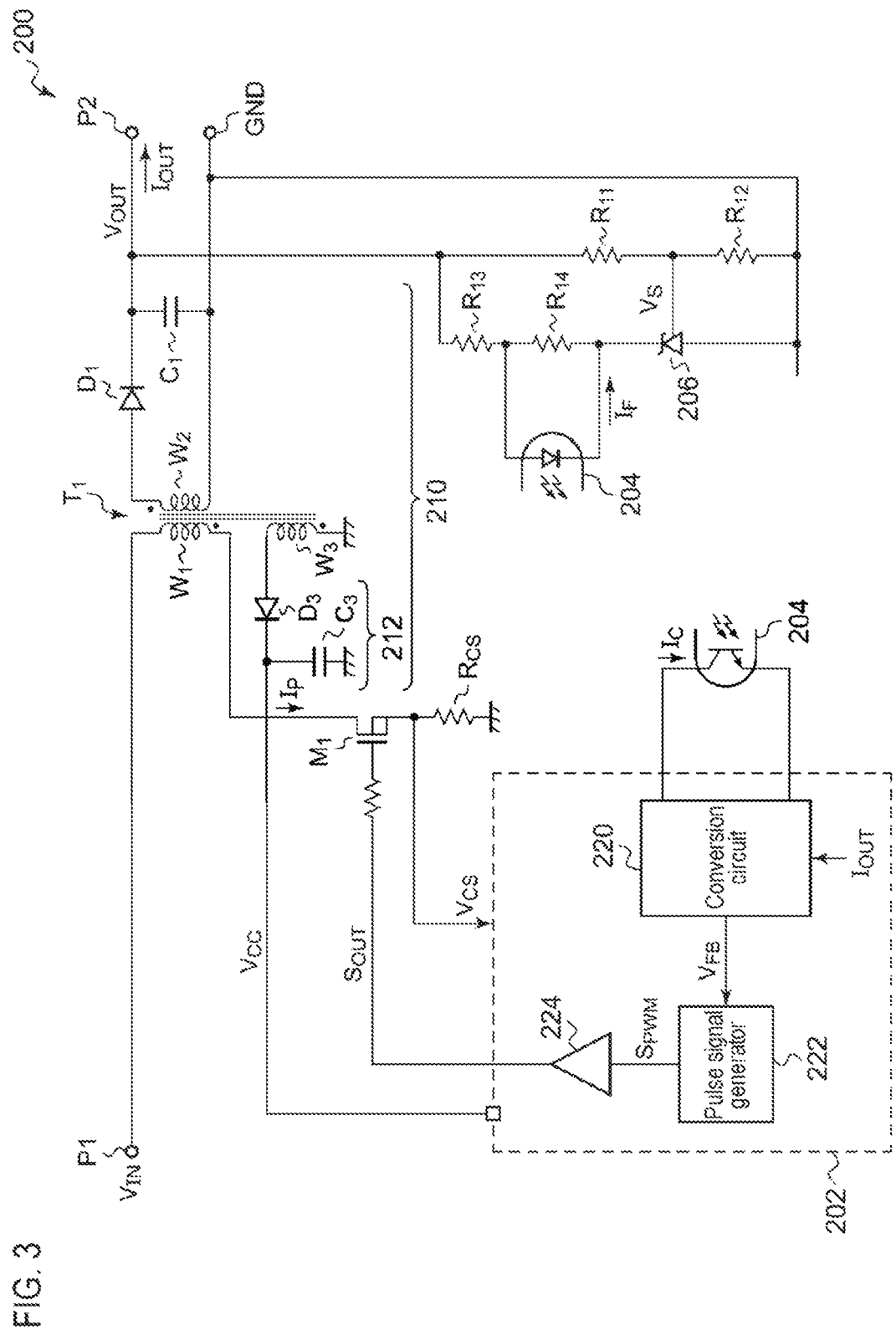
FIG. 3 is a circuit diagram of an isolated DC/DC converter according to an embodiment of the present disclosure.

FIG. 3 is a circuit diagram of an isolated DC/DC converter 200 according to an embodiment of the present disclosure.

The DC/DC converter 200 receives a DC voltage $V_{IN}$ at an input terminal $P_1$, steps down the same, and supplies an output voltage $V_{OUT}$, which is stabilized to a target value, to a load (not shown) connected to an output terminal $P_2$.

The DC/DC converter 200 includes a primary side controller 202, a photocoupler 204, a shunt regulator 206, an output circuit 210, and other circuit components. The output circuit 210 includes a transformer $T_1$, a rectifier element $D_1$, an output capacitor $C_1$, and a switching transistor $M_1$. The topology of the output circuit 210 is equal to that of a general flyback converter, and therefore, a description thereof will be omitted.

The switching transistor $M_1$ is connected to a primary winding $W_1$ of the transformer $T_1$. As this switching transistor $M_1$ is switched, the input voltage $V_{IN}$ is stepped down and an output voltage $V_{OUT}$ is generated. Then, the primary side controller 202 stabilizes the output voltage $V_{OUT}$ to a target value by adjusting a duty ratio of the switching of the switching transistor $M_1$.

The output voltage $V_{OUT}$ of the DC/DC converter 200 is divided by resistors $R_{11}$ and $R_{12}$. The feedback circuit 206, which is, for example, a shunt regulator, amplifies an error between the divided voltage (voltage detection signal) $V_S$ and a predetermined reference voltage $V_{REF}$ (not shown) which is internally set, and drives a light emitting element (light emitting diode) of an input side of the photocoupler 204 by a forward current $I_F$ corresponding to the error. A collector current $I_C$ corresponding to the forward current $I_F$ flows through a light receiving element (phototransistor) of an output side of the photocoupler 204.

The primary side controller 202 includes a conversion circuit 220, a pulse signal generator 222, and a driver 224. As will be described later, a portion or all of the primary side controller 202 may be integrated on a single semiconductor substrate. The conversion circuit 220 converts the collector current $I_C$ flowing through the light receiving element of the output side of the photocoupler 204 into a feedback voltage $V_{FB}$, which has a negative correlation with the collector current $I_C$. The conversion circuit 220 may be recognized as a current/voltage conversion circuit or may be recognized as a transimpedance circuit.

The pulse signal generator 222 generates a pulse signal $S_{PWM}$ corresponding to the feedback voltage $V_{FB}$. For example, the pulse signal generator 222 is a pulse width modulator, and the pulse signal $S_{PWM}$ has a duty ratio corresponding to the feedback voltage $V_{FB}$. The configuration of the pulse signal generator 222 is not specifically limited to the above, and can be configured by adopting a voltage mode, an average current mode, a peak current mode, a pseudo resonance mode, or the like. Alternatively, the pulse signal generator 222 may be another modulator such as a pulse frequency modulator. The driver 224 generates a gate pulse $S_{OUT}$ corresponding to the pulse signal $S_{PWM}$ to drive the switching transistor $M_1$.

The transformer $T_1$ has an auxiliary winding $W_3$. An auxiliary power supply circuit 212 includes a diode $D_3$ and a capacitor $C_3$, and rectifies and smooths a current flowing through the auxiliary winding $W_3$ to generate a power supply voltage $V_{CC}$. The power supply voltage $V_{CC}$ is supplied to the circuit block of the primary side.

A current sense resistor $R_{CS}$ is inserted between the switching transistor $M_1$ and a ground. A voltage drop (current detection signal $V_{CS}$), which is proportional to a current $I_P$ flowing through the primary winding $W_1$, is generated in the current sense resistor $R_{CS}$ during an ON period of the switching transistor $M_1$. The current detection signal $V_{CS}$ is used for overcurrent protection in the primary side controller 202. Alternatively, the pulse signal generator 222 in the peak current mode or the average current mode generates the pulse signal $S_{PWM}$ based on the current detection signal $V_{CS}$.

The conversion circuit 220 is configured such that the conversion characteristics from the collector current $I_C$ to the feedback voltage $V_{FB}$ are changed based on the output current $I_{OUT}$ of the DC/DC converter 200.

Figure 4A:
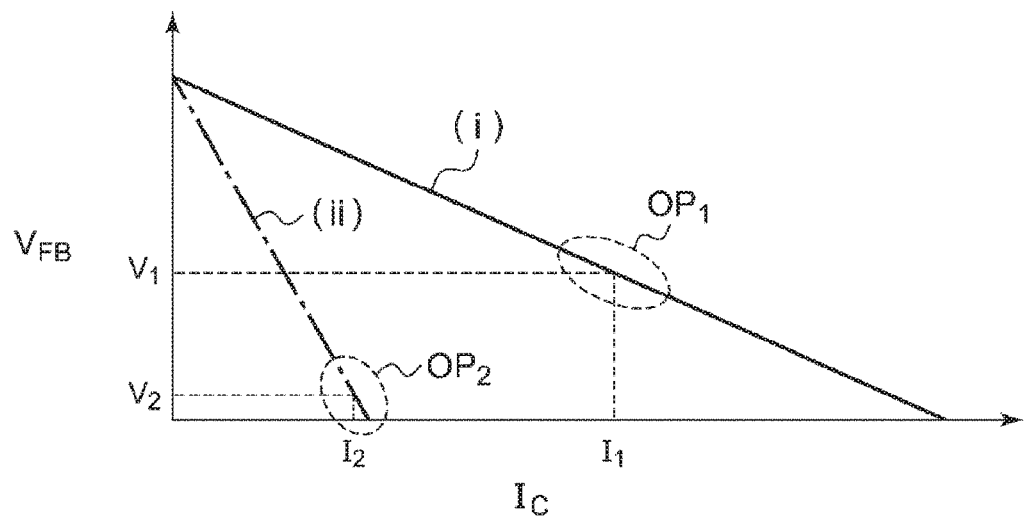
FIGS. 4A to 4C are diagrams illustrating examples of conversion characteristics of a conversion circuit.
Figure 4B:
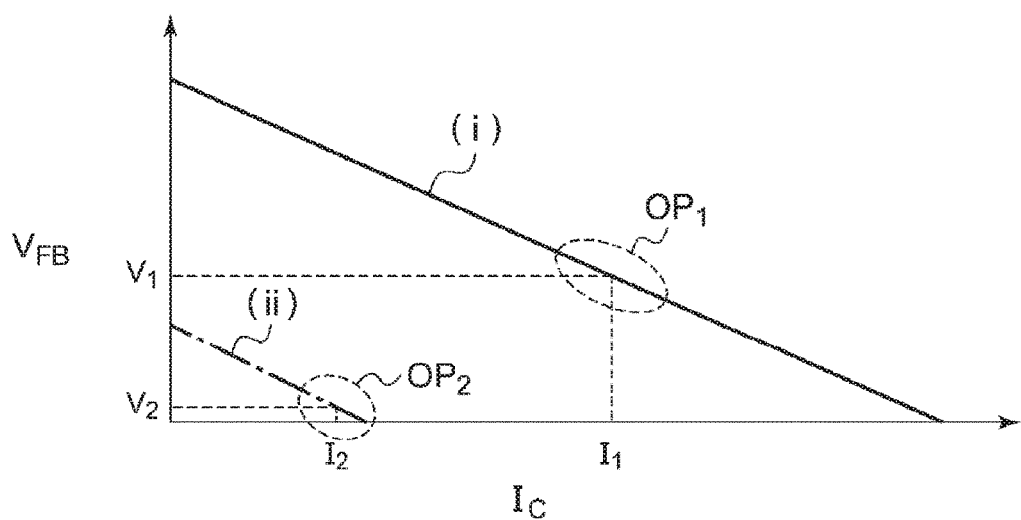
Figure 4C:
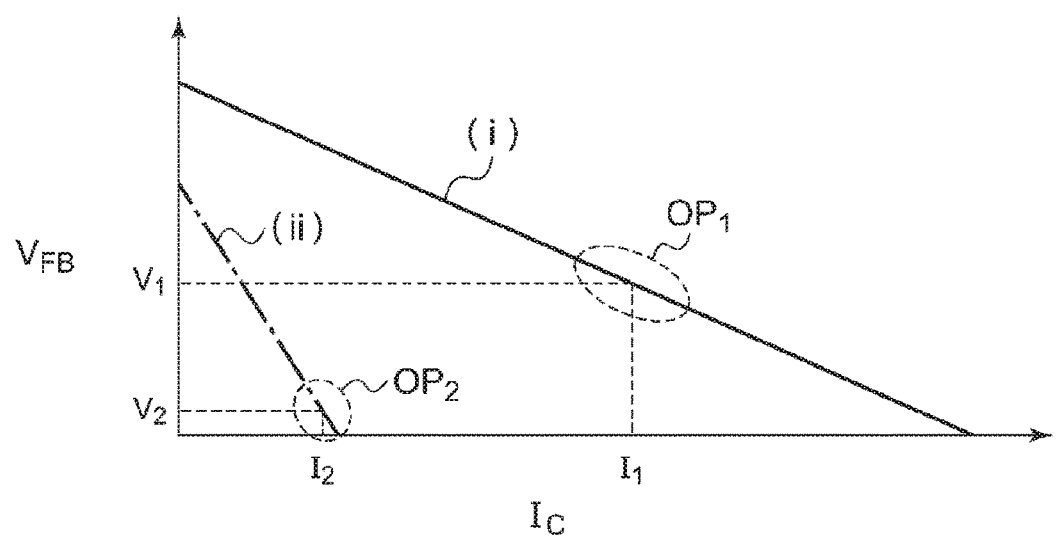

FIGS. 4A to 4C are diagrams illustrating examples of conversion characteristics of the conversion circuit 220. The solid line (i) indicates the characteristics when the output current $I_{OUT}$ is a rated current $I_{RATE}$ (heavy load state), and the alternate long and short dash line (ii) indicates the characteristic when the output current $I_{OUT}$ is substantially zero (light load state). The characteristics may vary continuously or discretely between the solid line (i) and the alternate long and short dash line (ii), depending on the output current $_{OUT}$.

The control characteristics (V-I characteristics) of FIG. 4A shows that the slope varies depending on the load current $I_{OUT}$. The control characteristic of FIG. 4B shows that the Y section (offset amount) varies depending on the load current $I_{OUT}$. The control characteristic of FIG. 4C shows that both the slope and the Y section (offset amount) vary depending on the load current $I_{OUT}$. The variation of the control characteristics in the conversion circuit 220 is not limited to FIGS. 4A to 4C, and other control characteristics may be adopted.

The configuration of the DC/DC converter 200 has been described above. Next, an operation thereof will be described.

Here, it will be described according to the control characteristics of FIG. 4A. In the rated output state (heavy load state), the conversion characteristics of (i) are selected. In the rated output state, the DC/DC converter 200 operates in a current continuous mode, and the duty ratio D of the switching does not depend on the output voltage $V_{OUT}$ and becomes a value $D_1$ determined by the input voltage $V_{IN}$, the output voltage $V_{OUT}$ and the winding ratio of the transformer $T_1$. An operating point at this time is indicated by the broken line $OP_1$. The feedback voltage $V_{FB}$ becomes a voltage V1 corresponding to the duty ratio $D_1$. The collector current $I_C$ of the photocoupler 204 at this time becomes $I_1$.

In the light load state, the conversion characteristics of (ii) are selected. In the light load state, the DC/DC converter 200 operates in a discontinuous mode, and the duty ratio D of the switching depends on the output current $I_{OUT}$. Therefore, the feedback voltage $V_{FB}$ varies along the alternate long and short dash line, depending on the output current $I_{OUT}$. An operating point of the lightest load state (standby state) where the output current $I_{OUT}$ is minimum (substantially zero) is indicated by the broken line $OP_2$. The duty ratio D at this time becomes a small value $D_2$, and the feedback voltage $V_{FB}$ becomes a value $V_2$ corresponding to the small duty ratio $D_2$. The collector current $I_C$ of the photocoupler 204 at this time becomes $I_2$.

Figure 2:
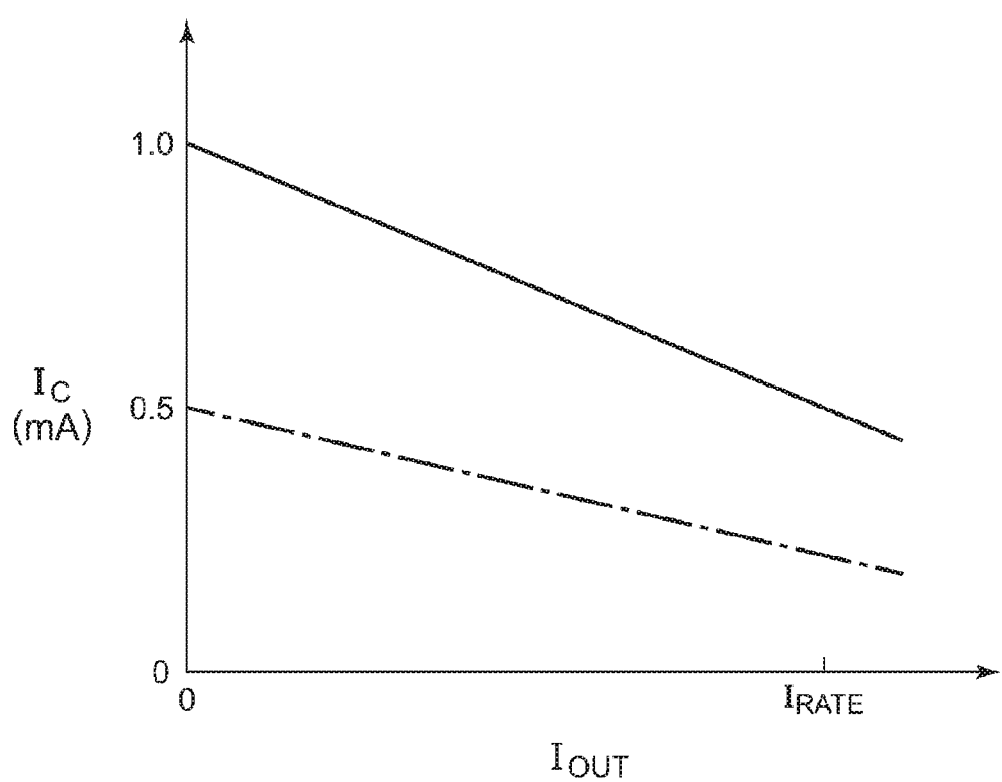
FIG. 2 illustrates a relationship between an output current $I_{OUT}$ and a collector current $I_C$.

In the DC/DC converter 200 of FIG. 2, it is assumed that the operating point is defined such that $I_1=1$ mA and $I_2=0.02$ mA. When the efficiency of the photocoupler 204 is 100%, the forward current $I_F$ of the photocoupler 204 falls to 0.02 mA in the standby state. When the $V_{OUT}=24$ V, the standby power consumption becomes 0.48 mW, which can be reduced to 1/50 compared with the conventional 24 mW.

In the rated load state (heavy load state), since the operating current of the photocoupler 204 is sufficiently large as 1 mA, it can be used in a region where the temperature dependency of the conversion efficiency is small. Thus, it is possible to reduce the temperature dependency of the gain of the feedback loop and to improve the stability of the system.

The operating currents $I_1$ and $I_2$ may be optimized based on the characteristics of the photocoupler 204 to be used, and the above numerical values are merely examples. The same effects can be obtained even when the control characteristics of FIGS. 4B and 4C are used.

The present disclosure is recognized by the block diagram or the circuit diagram of FIG. 3 or intended to cover various devices and circuits derived from the above description, but is not limited to the specific configuration. Hereinafter, more specific configuration examples or embodiment examples will be described to help understand and clarify the essence of the present disclosure and a circuit operation thereof, rather than to narrow the scope of the present disclosure.

First Configuration Example

Figure 5:
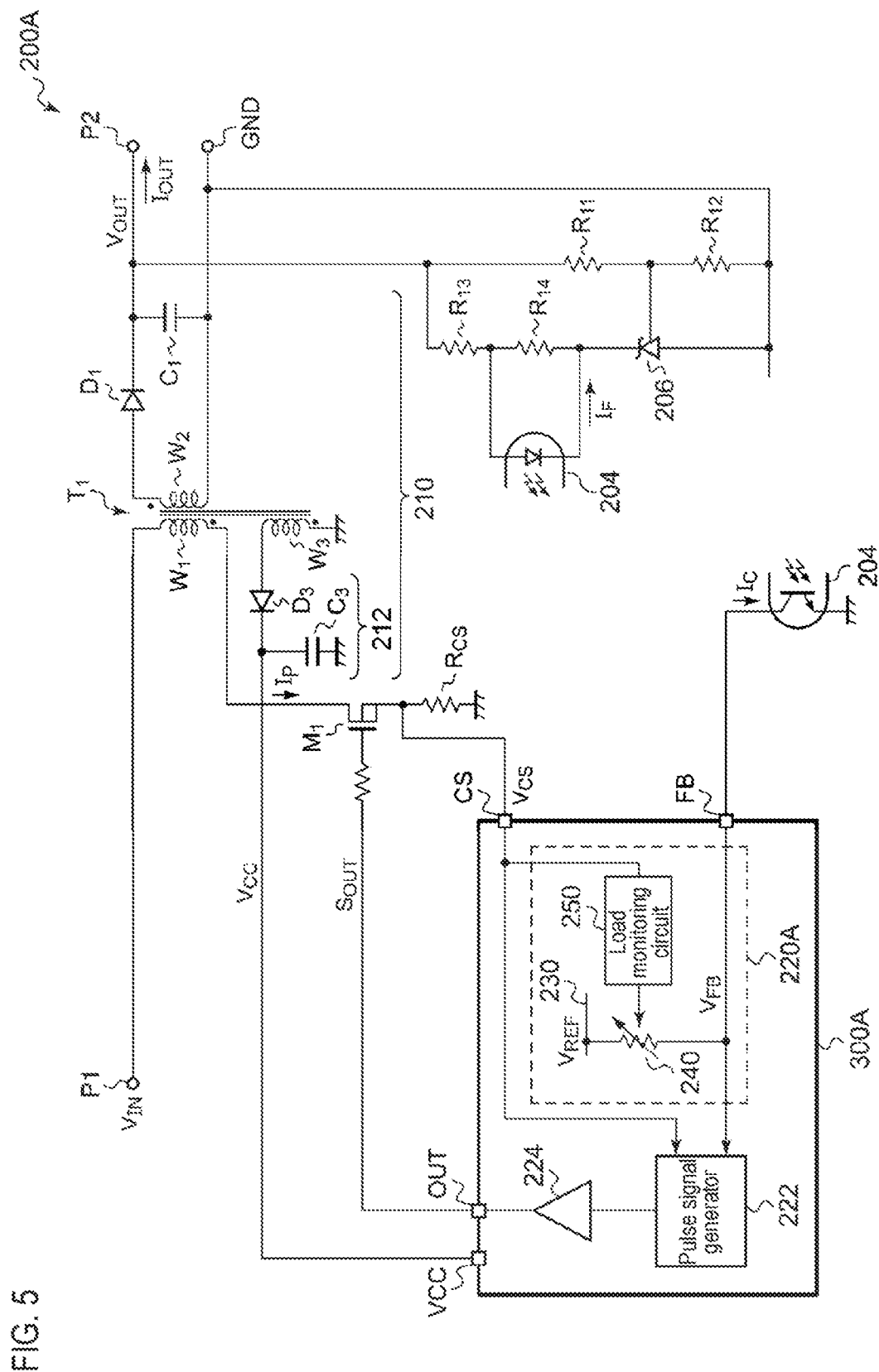
FIG. 5 is a circuit diagram of a first configuration example of the DC/DC converter.

FIG. 5 is a circuit diagram of a first configuration example (200A) of the DC/DC converter 200. A primary side controller integrated circuit (IC) (hereafter, simply referred to as a primary side controller) 300A is a functional IC in which the primary side controller 202 of FIG. 3 is integrated on a single semiconductor substrate.

The primary side controller 300A has a feedback (FB) pin, a current detection (CS) pin, an output (OUT) pin, and a power supply (VCC) pin. The primary side controller 300A further includes a conversion circuit 220A, a pulse signal generator 222, and a driver 224. The CS pin of the primary side controller 300A is connected to a current sense resistor $R_{CS}$ and receives a current detection signal $V_{CS}$ based on a voltage drop of the current sense resistor $R_{CS}$. The OUT pin is connected to a gate of the switching transistor $M_1$, and a power supply voltage $V_{CC}$ generated by an auxiliary power source circuit 212 is supplied to the VCC pin.

An emitter of the light receiving element of the photodetector 204 is grounded. A collector of the light receiving element of the photodetector 204 is connected to the FB pin. The conversion circuit 220A includes a variable impedance circuit 240 and a load monitoring circuit 250. The conversion circuit 220A is installed between the FB pin and a reference voltage line 230, and it is configured such that its impedance Z varies depending on the output current $I_{OUT}$ of the DC/DC converter 200A. A reference voltage $V_{REF}$ generated by a reference voltage source (not shown) is supplied to the reference voltage line 230.

When the impedance of the variable impedance circuit 240 is Z, the feedback voltage $V_{FB}$ of the FB pin (terminal) is expressed by Eq. (1).

$$V_{FB}=V_{REF}-Z \times I_C \qquad \text{Eq. (1)}$$

Therefore, the conversion characteristics of the conversion circuit 220 can be controlled by changing the impedance Z.

The load monitoring circuit 250 monitors the output current $I_{OUT}$, and controls the impedance Z of the variable impedance circuit 240 based on the output current $I_{OUT}$. Here, a peak value (or an average value) of a current $I_P$ flowing in the switching transistor $M_1$ depends on the output current $I_{OUT}$, where a large amount of the current $I_P$ flows in the switching transistor $M_1$ in the heavy load state in which the output current $I_{OUT}$ is large and a small amount of the current $I_P$ flows in the switching transistor $M_1$ in the light load state in which the output current $I_{OUT}$ is small. Therefore, the conversion circuit 220A monitors the output current $I_{OUT}$ of the DC/DC converter 200A based on the current detection signal $V_{CS}$, and changes the impedance Z depending on the current detection signal $V_{CS}$.

Figure 6A:
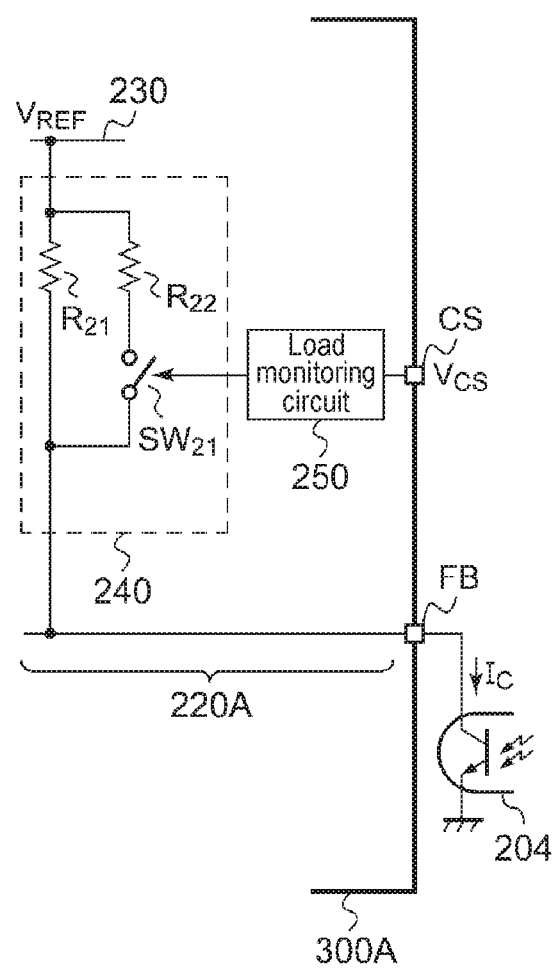
FIGS. 6A to 6C are circuit diagrams illustrating specific configuration examples of the conversion circuit.
Figure 6B:
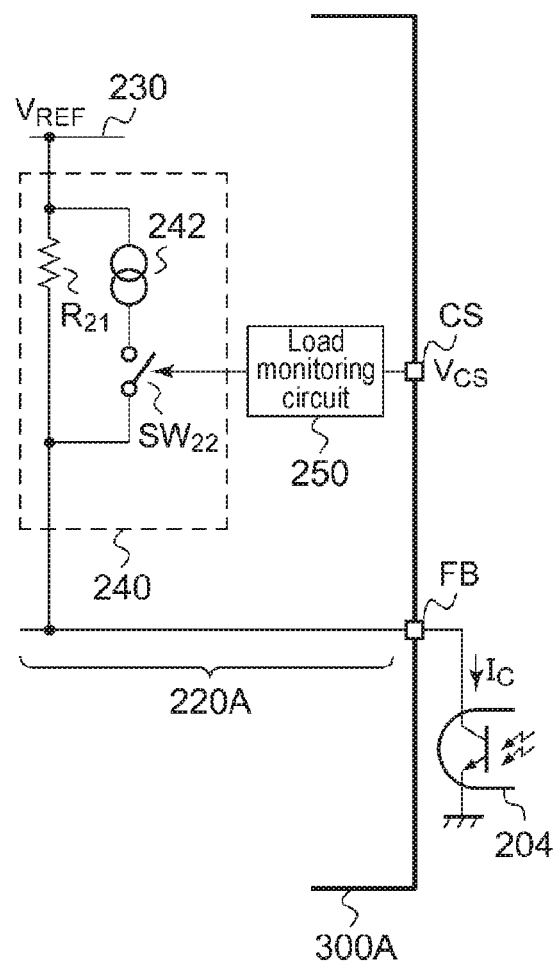
Figure 6C:
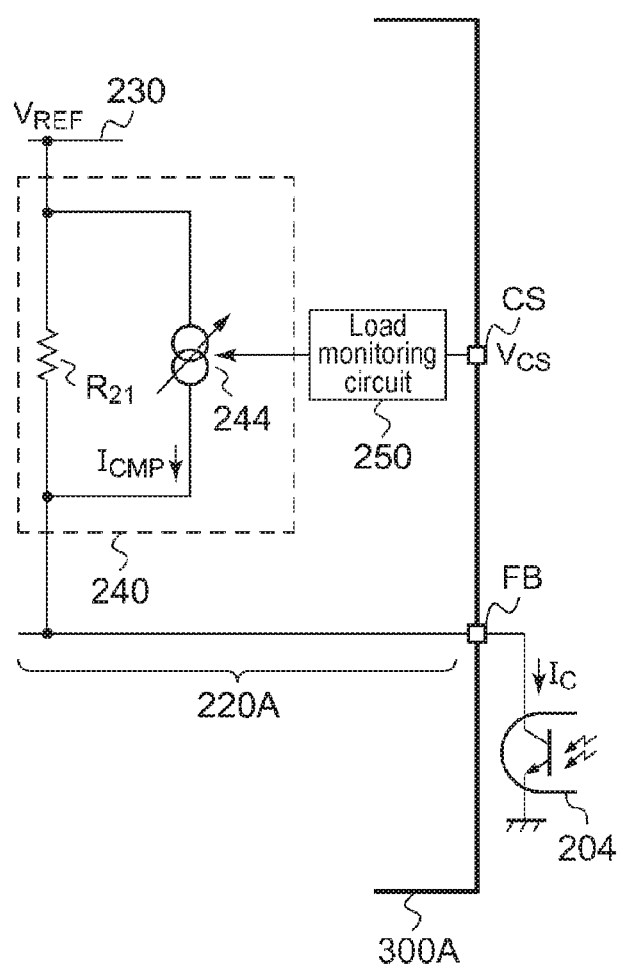

FIGS. 6A to 6C are circuit diagrams illustrating specific configuration examples of the conversion circuit 220A.

Referring to FIG. 6A, the variable impedance circuit 240 includes a first resistor $R_{21}$ installed between the collector (i.e., FB pin) of the light receiving element of the photocoupler 204 and the reference voltage line 230, and a second resistor $R_{22}$ and a switch $SW_{21}$ installed in series between both ends of the first resistor $R_{21}$. The ON/OFF state of the switch $SW_{21}$ may be switched depending on the output current $I_{OUT}$. The switch $SW_{21}$ may be configured by a bipolar transistor or a field effect transistor (FET). The impedance Z of the variable impedance circuit 240 becomes a first value $R_{21}$ when the switch $SW_{21}$ is turned off, and becomes a second value $R_{21}//R_{22}$ when the switch $SW_{21}$ is turned on. The symbol "//" represents a combined impedance of parallel resistors. According to the variable impedance circuit 240 of FIG. 6A which may be recognized as a two-stage variable resistor, the variable impedance circuit 240 of FIG. 6A can realize the control characteristic of FIG. 4A.

For example, the load monitoring circuit 250 compares the current detection signal $V_{CS}$ at the CS pin with a threshold voltage $V_{TH}$, and turns on the switch $SW_{21}$ when $V_{CS}>V_{TH}$, namely in the heavy load state, and turns off the switch $SW_{21}$ when $V_{CS}<V_{TH}$, namely in the light load state.

In FIG. 6A, it is possible to configure three or more stages of variable resistors by increasing the number of resistors and switches of the variable impedance circuit 240. In this case, the number of threshold voltages $V_{TH}$ in the load monitoring circuit 250 may be increased and the resistance values of the variable impedance circuit 240 may be switched to three or more stages.

Referring to FIG. 6B, the variable impedance circuit 240 includes a first resistor $R_{21}$ installed between the collector (i.e., FB pin) of the light receiving element of the photocoupler 204 and the reference voltage line 230, and a current source 242 and a switch $SW_{22}$ installed in series between both ends of the first resistor $R_{21}$. The ON/OFF state of the switch $SW_{22}$ may be switched depending on the output current $I_{OUT}$. When the switch $SW_{22}$ is turned on, the current source 242 is connected to the FB pin so that the impedance Z of the variable impedance circuit 240 increases. According to the variable impedance circuit 240 of FIG. 6B, it is possible to realize the control characteristics of FIG. 4B. The switch $SW_{22}$ may be built in the current source 242.

Referring to FIG. 6C, the variable impedance circuit 240 includes a first resistor $R_{21}$ installed between the collector (i.e., FB pin) of the light receiving element of the photocoupler 204 and the reference voltage line 230, and a variable current source 244 installed in series between both ends of the first resistor $R_{21}$. The variable current source 244 generates a correction current $I_{CMP}$ corresponding to the output current $I_{OUT}$. For example, the variable current source 244 may generate a current $I_{CMP}$ corresponding to the current detection signal $V_{CS}$ at the CS pin.

According to the variable impedance circuit 240 of FIG. 6C, it is possible to realize the control characteristics of FIG. 4B and also to continuously change the V-I characteristics between (i) and (ii) depending on the output current $I_{OUT}$.

In summary, the variable impedance circuit 240 may be configured by discrete or continuous variable resistance, variable current sources, a combination thereof, or the like.

Figure 7A:
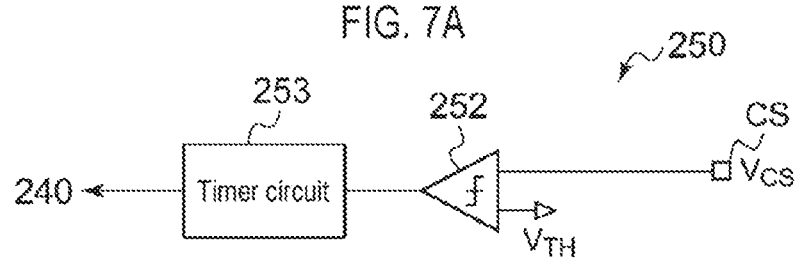
FIGS. 7A and 7B are circuit diagrams illustrating configuration examples of a load monitoring circuit.
Figure 7B:
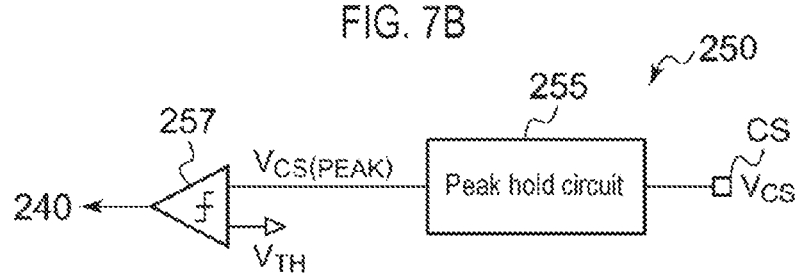

FIGS. 7A and 7B are circuit diagrams illustrating configuration examples of the load monitoring circuit 250. The load monitoring circuit 250 of FIG. 7A includes a first comparator 252 and a timer circuit 253. The first comparator 252 compares a voltage drop (current detection signal) $V_{CS}$ of the current sense resistor $R_{CS}$ with a threshold value $V_{TH}$. The load monitoring circuit 250 controls the conversion characteristics depending on an output of the first comparator 252.

In the timer circuit 253, its output is changed for a certain period of time using the output of the first comparator 252 as a trigger. The impedance of the variable impedance circuit 240, i.e., the conversion characteristic of the conversion circuit 220A, is controlled depending on the output of the timer circuit 253.

The load monitoring circuit 250 of FIG. 7B includes a peak hold circuit 255 and a third comparator 257. The peak hold circuit 255 peak-holds the current detection signal $V_{CS}$. The third comparator 257 compares a peak value $V_{CS(PEAK)}$ of the current detection signal $V_{CS}$ with a threshold value $V_{TH}$. The impedance of the variable impedance circuit 240, i.e., the conversion characteristic of the conversion circuit 220A, is controlled depending on an output of the third comparator 257.

Figure 8A:
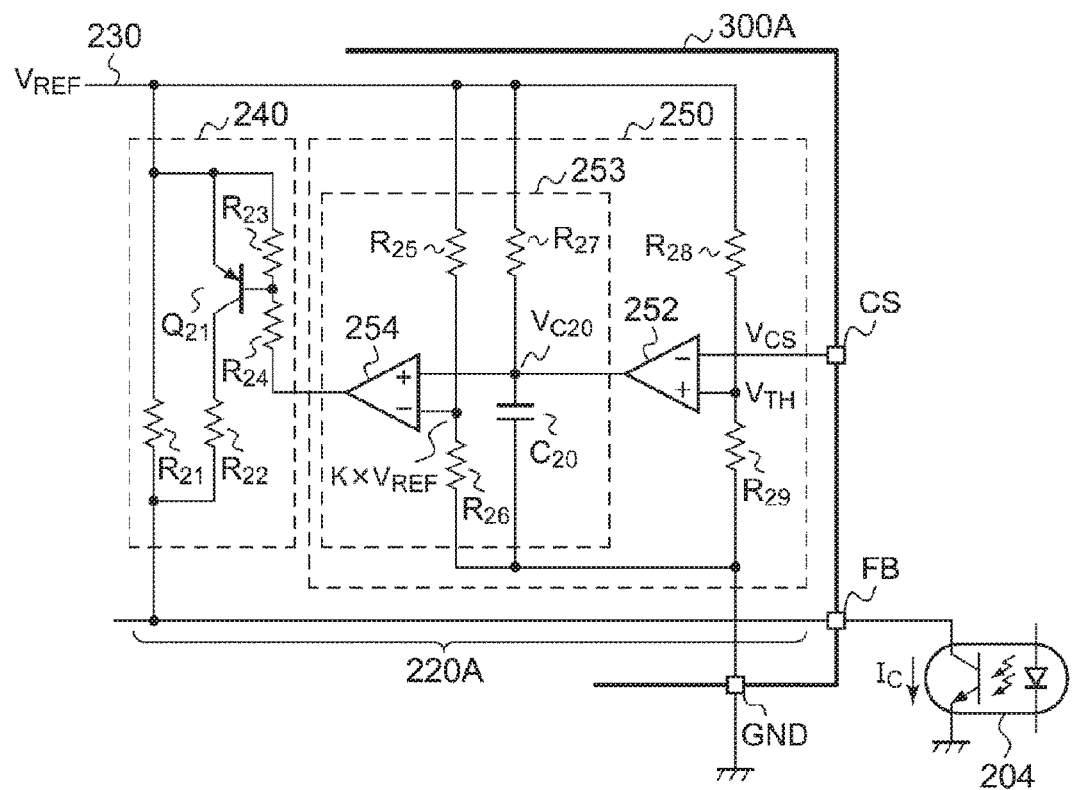
FIGS. 8A and 8B are circuit diagrams illustrating more specific configuration examples of the conversion circuit.
Figure 8B:
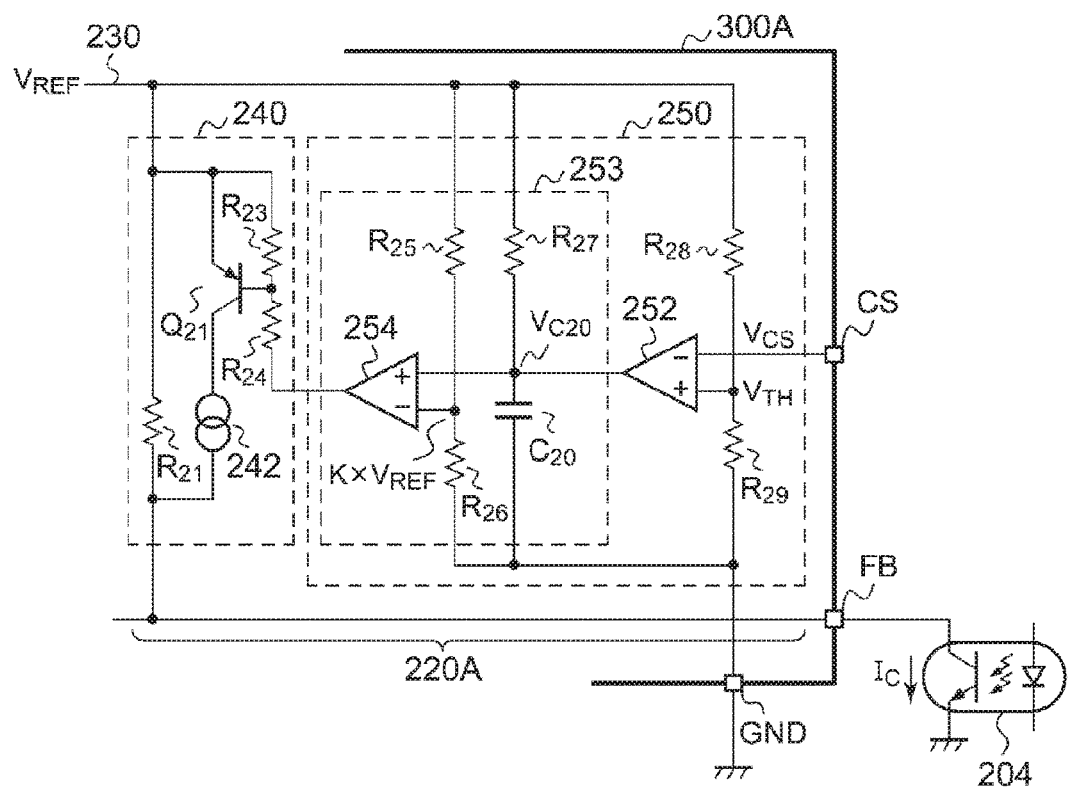

FIGS. 8A and 8B are circuit diagrams illustrating specific configuration examples of the conversion circuit 220A.

FIG. 8A corresponds to FIG. 6A. A transistor $Q_{21}$ is a PNP-type bipolar transistor, and forms the switch $SW_{21}$ of FIG. 6A together with resistors $R_{23}$ and $R_{24}$.

The timer circuit 253 includes a capacitor $C_{20}$ connected to the output of the first comparator 252, a resistor $R_{27}$ (or a current source) for charging the capacitor $C_{20}$, and a second comparator 254 for comparing a voltage $V_{C20}$ of the capacitor $C_{20}$ with a determination reference value $K \times V_{REF}$. The conversion characteristics are controlled depending on an output of the second comparator 254.

Resistors $R_{28}$ and $R_{29}$ are installed in series between the reference voltage line 230 and the GND pin, and divides the reference voltage $V_{REF}$ to generate the threshold voltage $V_{TH}$. The first comparator 252 compares the current detection signal $V_{CS}$ with the threshold voltage $V_{TH}$. The first comparator 252 has an output of an open collector (open drain), and a time constant circuit including the capacitor $C_{20}$ and the resistor $R_{27}$ is connected to its output. Resistors $R_{25}$ and $R_{26}$ are installed in series between the reference voltage line 230 and the GND pin, and divides the reference voltage $V_{REF}$ to generate the determination reference voltage $K \times V_{REF}$ (0<K<1, here K=½). The second comparator 254 has an output of an open collector (open drain), and when the voltage $V_{C20}$ of the capacitor $C_{20}$ is lower than the determination reference voltage $V_{REF}/2$, the second comparator 254 pulls down the potential of the base of the transistor $Q_{21}$ to a low level and turns on the transistor $Q_{21}$.

The configuration of the timer circuit 253 is not particularly limited to the above, and a digital timer for counting a clock, a one-shot multivibration circuit, and other known circuits may be used.

An operation of the conversion circuit 220A of FIG. 8A will be described. FIGS. 9A and 9B are operational waveform diagrams of the conversion circuit 220A in FIG. 8A. FIG. 9A illustrates an operation of a light load state, and FIG. 9B illustrates an operation of a heavy load state.

Referring to FIG. 9A, in the light load state, the amplitude of the primary current $I_P$ flowing in the switching transistor $M_1$ is small, and the current detection signal $V_{CS}$ is lower than a threshold voltage $V_{TH}$. Therefore, the first comparator 252 is in high impedance (open), and the voltage $V_{C20}$ of the capacitor $C_{20}$ is kept at a level equal to the reference voltage $V_{REF}$. Since $V_{C20} > V_{REF}/2$ is formed, the output of the second comparator 254 is high impedance, and the transistor $Q_{20}$ is kept in the OFF state.

Referring to FIG. 9B, in the heavy load state, the amplitude of the primary current $I_P$ flowing in the switching transistor $M_1$ increases, and the current detection signal $V_{CS}$ exceeds the threshold voltage $V_{TH}$. Therefore, the first comparator 252 periodically becomes a low level, the capacitor $C_{20}$ is discharged, and its voltage $V_{C20}$ drops to 0 V. Thus, the output of the second comparator 254 becomes a low level and the transistor $Q_{21}$ is turned on.

When the primary current $I_P$ becomes zero as the switching transistor $M_1$ is turned off. $V_{CS} < V_{TH}$ and the output of the first comparator 252 becomes a high impedance. As a result, the capacitor $C_{20}$ is charged via the resistor $R_{27}$ and the voltage $V_{C20}$ increases according to a time constant τ of $C_{20}$ and $R_{27}$. The time constant τ is defined such that $V_{C20} < V_{REF}/2$ is kept in the heavy load state.

When the switching transistor $M_1$ is turned on in a next cycle, the primary current $I_P$ starts to increase again. When $V_{CS} > V_{TH}$, the output of the first comparator 252 becomes a low level, the capacitor $C_{20}$ is discharged, and the voltage $V_{C20}$ becomes 0 V again. In the heavy load state, the transistor $Q_{21}$ is kept in the ON state by repeating such operation.

As described above, according to the conversion circuit 220A of FIG. 8A, the impedance Z of the variable impedance circuit 240 can be appropriately changed depending on the current detection signal $V_{CS}$.

Returning to FIG. 8B, the variable impedance circuit 240 of FIG. 8B further includes a current source 242, in addition to the variable impedance circuit 240 of FIG. 8A. The other components are similar to those of FIG. 8A. The transistor $Q_{21}$ functioning as the switch may also be installed in the current source 242.

Second Configuration Example

Figure 10:
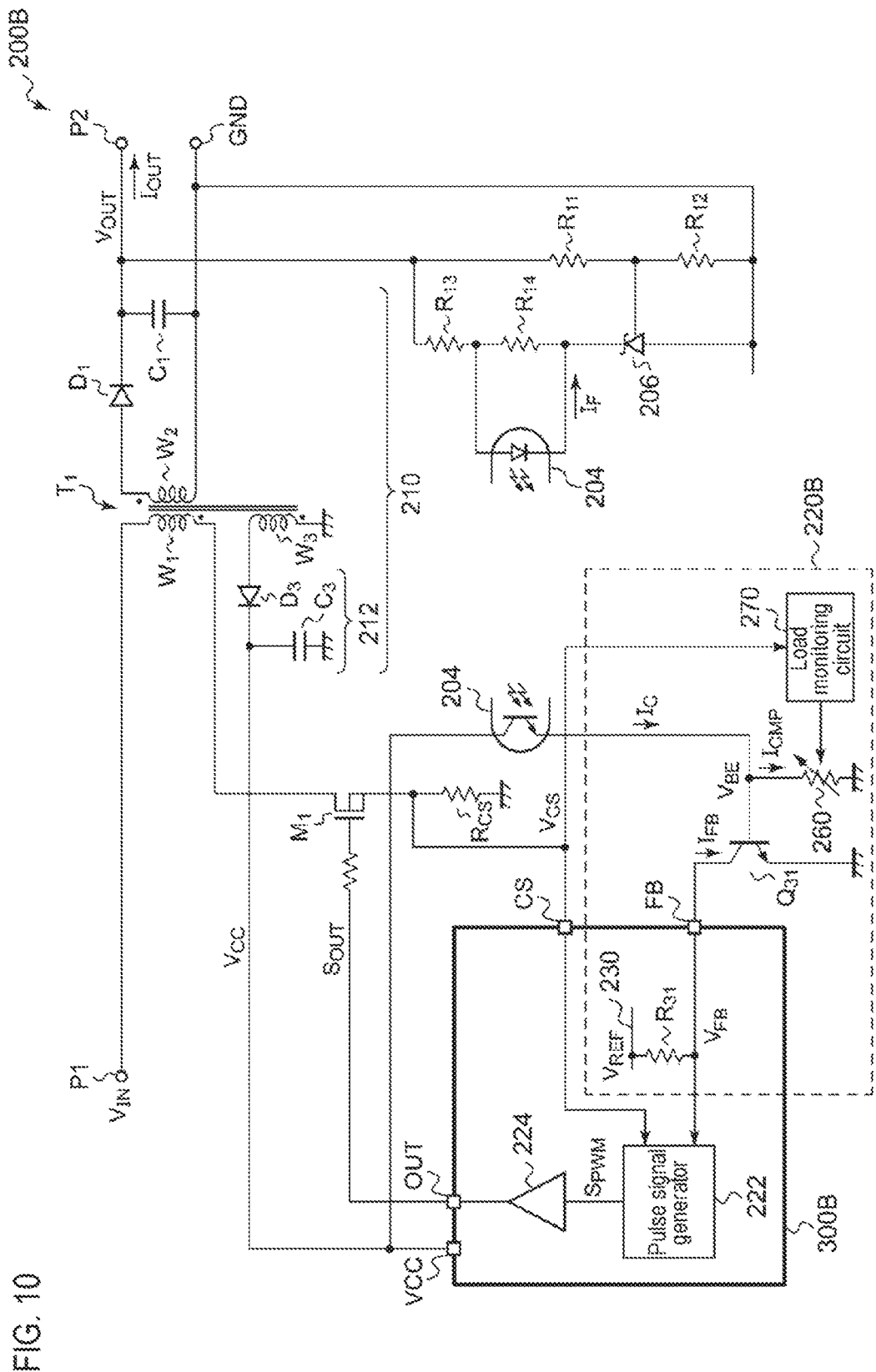
FIG. 10 is a circuit diagram of a second configuration example of the DC/DC converter.

FIG. 10 is a circuit diagram of a second configuration example (200B) of the DC/DC converter 200. The pulse signal generator 222, the driver 224 and a portion of the conversion circuit 220 in the primary side controller 202 of FIG. 3 are built in a primary side controller 300B, and a portion of the conversion circuit 220 is externally attached.

A conversion circuit 220B includes a resistor $R_{31}$, a first transistor $Q_{31}$, a variable impedance circuit 260, and a load monitoring circuit 270. The resistor $R_{31}$ is installed between the reference voltage line 230 and the FB pin. That is, the primary side controller 300B has the same configuration as that of the conventional primary side controller.

The first transistor $Q_{31}$ is an NPN-type bipolar transistor whose collector is connected to the FB pin, emitter is grounded, and base is connected to the emitter of the light receiving element of the photocoupler 204.

The variable impedance circuit 260 is installed between the base of the first transistor $Q_{31}$ and the ground. The impedance Z of the variable impedance circuit 260 is configured to be variable depending on the output current $I_{OUT}$.

It is assumed that the current flowing in the first transistor $Q_{31}$ is $I_{FB}$, and the resistance value of the resistor $R_{31}$ is R. At this time, a feedback voltage $V_{FB}$ is expressed by Eq. (2).

$$V_{FB}=V_{REF}-R\times I_{FB} \quad \text{Eq. (2)}$$

When the base current of the first transistor $Q_{31}$ approximates to zero and the impedance of the variable impedance circuit 260 is Z, a base voltage $V_{BE}$ of the first transistor $Q_{31}$ is expressed by Eq. (3).

$$V_{BE} \approx I_C \times Z \quad \text{Eq. (3)}$$

When the mutual conductance of the first transistor $Q_{31}$ is written as gm, Eq. (4) is obtained.

$$I_{FB}=V_{BE}\times gm \quad \text{Eq. (4)}$$

Eq. (5) is obtained from Eqs. (2) to (4).

$$V_{FB}=V_{REF}-R\times I_C \times Z \times gm \quad \text{Eq. (5)}$$

Therefore, when the impedance Z of the variable impedance circuit 260 is changed, the slope of the conversion characteristics from the collector current $I_C$ to the feedback voltage $V_{FB}$ can be changed as illustrated in FIG. 4A. The first transistor $Q_{31}$ may be configured with an N-channel MOSFET.

From another point of view, the variable impedance circuit may also be recognized as a variable current source. Assuming that the current amplification factor of the first transistor $Q_{31}$ is β and the current flowing in the variable impedance circuit 260 is $I_{CMP}$, Eq. (6) is obtained.

$$I_{FB}=\beta \times (I_C-I_{CMP}) \quad \text{Eq. (6)}$$

By substituting Eq. (6) into Eq. (2), Eq. (7) is obtained.

$$V_{FB}=V_{REF}-R\times \beta \times (I_C-I_{CMP}) \quad \text{Eq. (7)}$$

By modifying Eq. (7), Eq. (7') is obtained.

$$V_{FB}=V_{REF}+R\times \beta \times I_{CMP}-(R\times \beta \times I_C) \quad \text{Eq. (7')}$$

$V_{REF}+R\times \beta \times I_{CMP}$ corresponds to the Y section of FIG. 4B. When the impedance of the variable impedance circuit 260 is changed, the current $I_{CMP}$ is changed, so that the offset of the control characteristics may be changed.

It can be said that the conversion circuit 220B of FIG. 10 shows one of the characteristics of FIGS. 4A, 4B, and 4C depending on the operating point of the conversion circuit 220.

The load monitoring circuit 270 controls the impedance Z of the variable impedance circuit 260 depending on the output current $I_{OUT}$. The load monitoring circuit 270 may detect the output current $I_{OUT}$ based on the current detection signal $V_{CS}$.

FIGS. 11A to 11D are circuit diagrams illustrating specific configuration examples of the conversion circuit 220B.

Figure 11A:
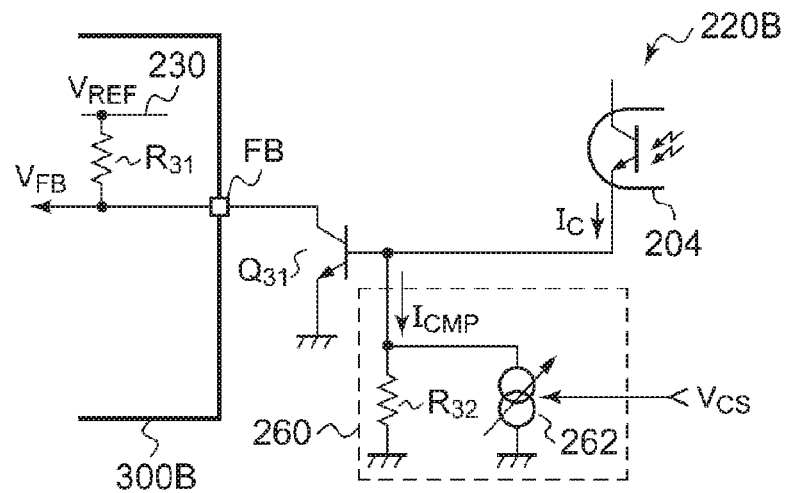
FIGS. 11A to 11D are circuit diagrams illustrating specific configuration examples of the conversion circuit.

Referring to FIG. 11A, the variable impedance circuit 260 includes a resistor $R_{32}$ and a variable current source 262. The resistor $R_{32}$ may be omitted. The variable current source 262 generates a current $I_{CMP}$ corresponding to (having a positive correlation with) the current detection signal $V_{CS}$. This correction current $I_{CMP}$ is sunk from the base of the first transistor $Q_{31}$.

Figure 11B:
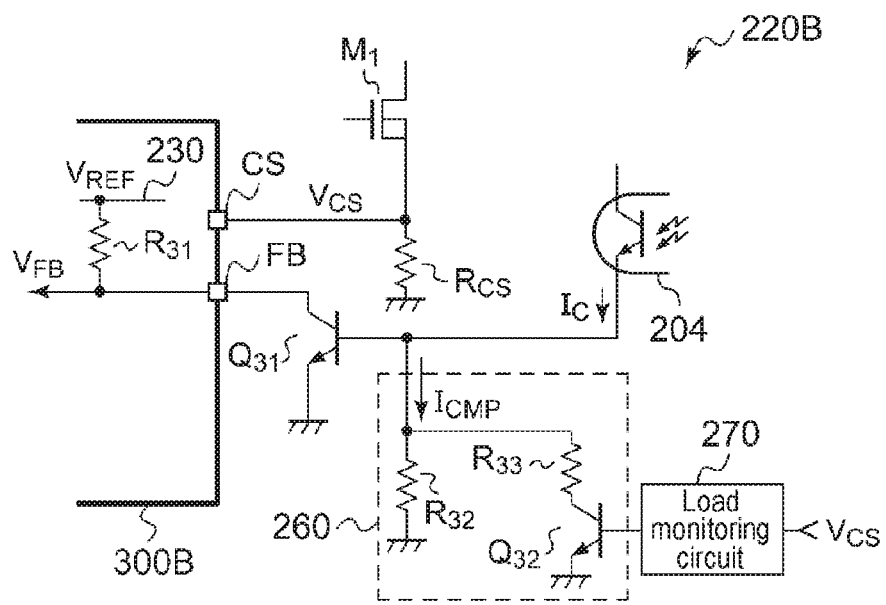

Referring to FIG. 11B, the variable impedance circuit 260 includes resistors $R_{32}$ and $R_{33}$, and a second transistor $Q_{32}$. The second transistor $Q_{32}$ may be recognized to correspond to the variable current source 262 of FIG. 11A, or the second transistor $Q_{32}$ may be recognized to correspond to a switch $SW_{31}$ of FIG. 11C.

The load monitoring circuit 270 determines whether it is in the heavy load state or the light load state based on the current detection signal $V_{CS}$, and controls the impedance of the variable impedance circuit 260 based on the determination result. For example, the load monitoring circuit 270 may be configured similarly to the load monitoring circuit 250 of FIG. 8A. In this case, a power source voltage $V_{CC}$ or a reference voltage $V_{REF}$ generated by the primary side controller 300A may be supplied to a signal line corresponding to the reference voltage line 230 of FIG. 8A.

Figure 11C:
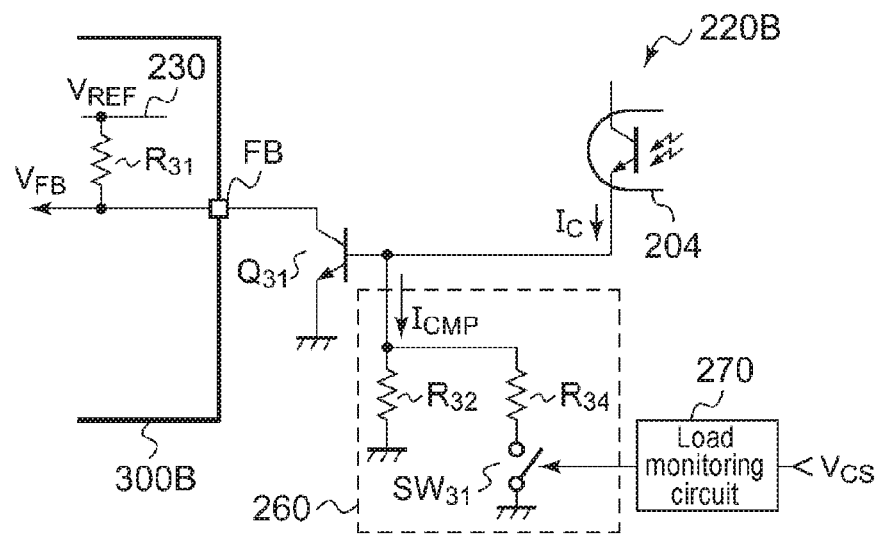

Referring to FIG. 11C, the variable impedance circuit 260 includes resistors $R_{32}$ and $R_{34}$, and the switch $SW_{31}$. The load monitoring circuit 270 compares the current detection signal $V_{CS}$ with a threshold value $V_{TH}$, and turns on the switch $SW_{31}$ in the heavy load state where $V_{CS}>V_{TH}$, and turns off the switch $SW_{31}$ in the light load state where $V_{CS}<V_{TH}$. The load monitoring circuit 270 of FIG. 11C may be configured similarly to the load monitoring circuit 250 of FIG. 8A.

Figure 11D:
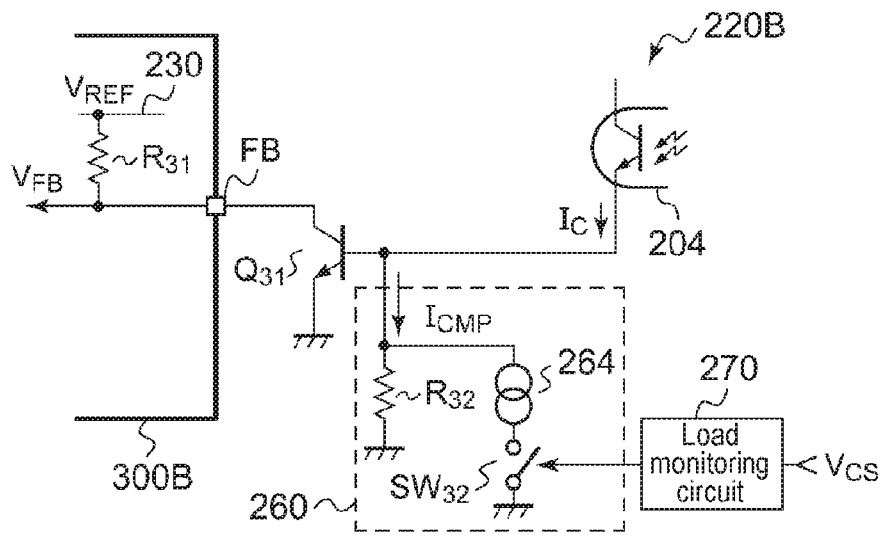

Referring to FIG. 11D, the variable impedance circuit 260 includes a resistor $R_{32}$, a current source 264, and a switch $SW_{32}$. The load monitoring circuit 270 is similar to the load monitoring circuit 270 of FIG. 11C. When the switch $SW_{32}$ is turned on, the current source 264 becomes active and generates a correction current $I_{CMP}$.

The configuration example of the variable impedance circuit 260 has been described above.

In the second embodiment, a conventional controller may be used as the primary side controller 300B, and the same effects as those of the first embodiment can be obtained by adding the peripheral circuits. Furthermore, the conversion circuit 220B of FIG. 10 may be integrated in the primary side controller 300B.

Applications

Next, applications of the DC/DC converter 200 will be described.

Figure 12:
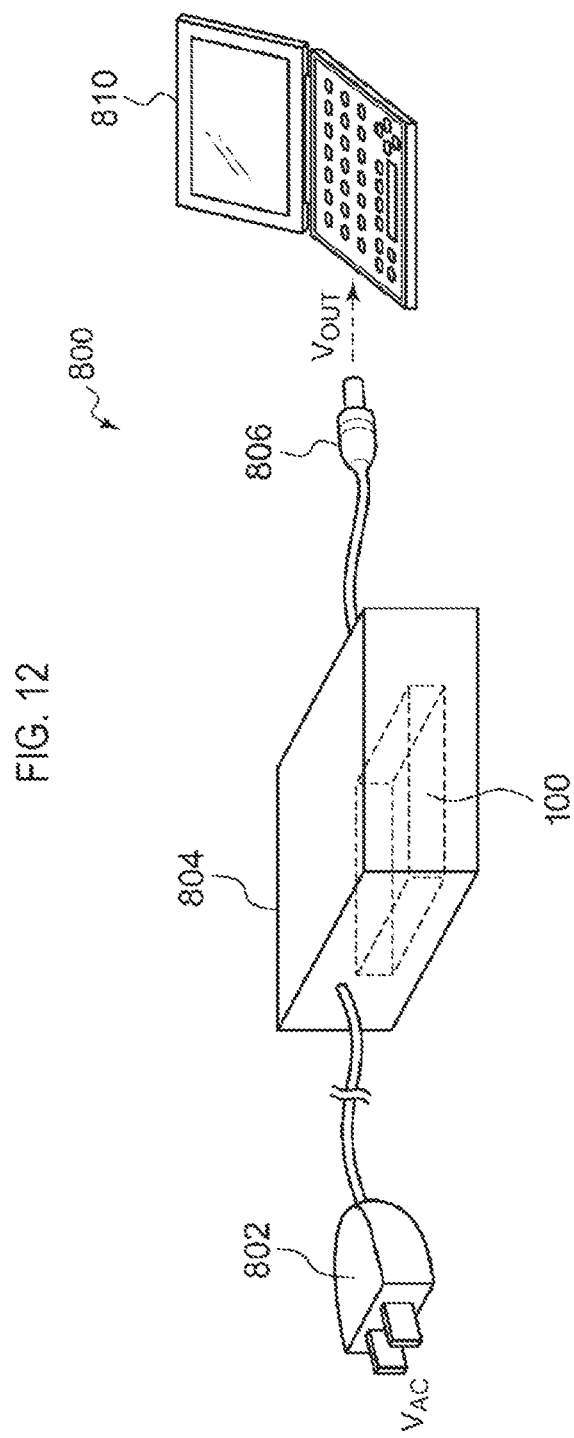
FIG. 12 is a diagram illustrating an AC adapter having an AC/DC converter.

FIG. 12 is a diagram illustrating an AC adapter 800 having an AC/DC converter 100. The AC adaptor 800 includes a plug 802, a housing 804, and a connector 806. The plug 802 receives a commercial AC voltage $V_{AC}$ from a socket (not shown). The AC/DC converter 100 is mounted inside the housing 804. A DC output voltage $V_{OUT}$ generated by the AC/DC converter 100 is supplied from the connector 806 to an electronic device 810. Examples of the electronic device 810 include a laptop computer, a digital camera, a digital video camera, a mobile phone, a portable audio player, and the like.

Figure 13A:
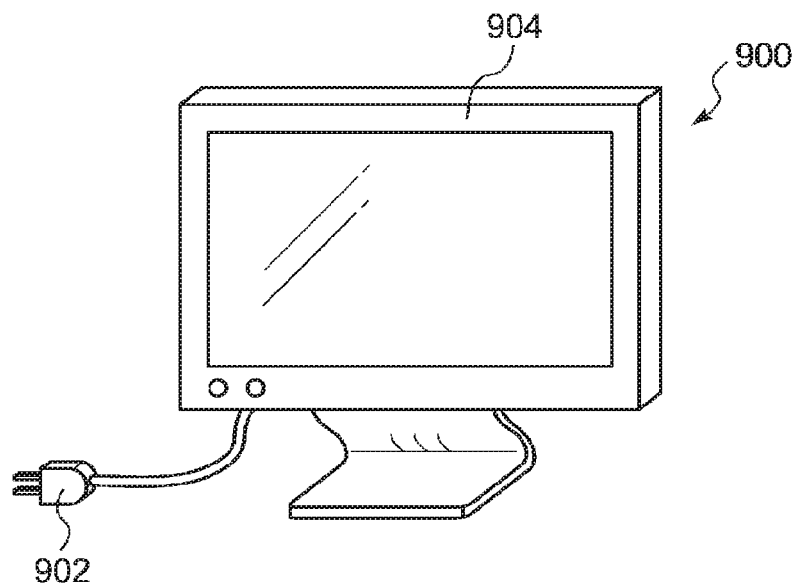
FIGS. 13A and 13B are diagrams illustrating electronic devices having an AC/DC converter.
Figure 13B:
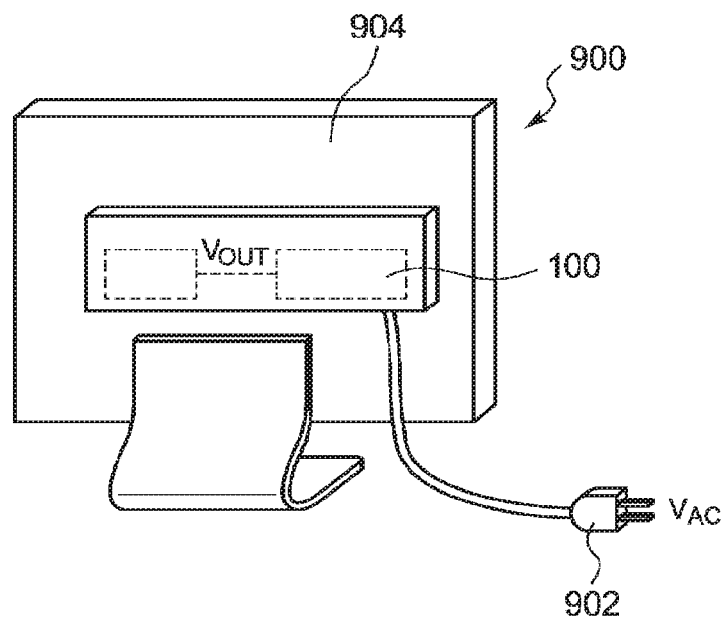

FIGS. 13A and 13B are diagrams illustrating electronic devices 900 having an AC/DC converter 100. The electronic devices 900 of FIGS. 13A and 13B are display devices, but the types of the electronic devices 900 are not particularly limited thereto and the devices may be devices incorporating a power source device such as an audio device, a refrigerator, a washing machine, a vacuum cleaner, or the like.

The plug 902 receives a commercial AC voltage $V_{AC}$ from a socket (not shown). The AC/DC converter 100 is mounted inside a housing 904. A DC output voltage $V_{OUT}$ generated by the AC/DC converter 100 is supplied to a load such as a microcomputer, a digital signal processor (DSP), a power supply circuit, a lighting device, an analog circuit, a digital circuit, or the like, which is mounted inside the same housing 904.

The present disclosure has been described above based on the embodiment. It should be understood by those skilled in the art that the embodiment is merely illustrative and may be differently modified by any combination of the components or processes, and the modifications are also within the scope of the present disclosure. Hereinafter, these modifications will be described.

(First Modification)

A synchronous rectification transistor and its control circuit may be installed on the secondary side of the DC/DC converter 200, instead of the rectifier element $D_1$. The rectifier element $D_1$ may be installed on a high potential side of the secondary winding $W_2$ or may be provided on a low potential side thereof.

(Second Modification)

In some embodiments, there has been described a case in which the comparator compares the current detection signal $V_{CS}$ on the primary side with the threshold value to determine whether it is a light load or a heavy load, but the present disclosure is not limited thereto. For example, the current detection signal $V_{CS}$ is converted into a digital value by an A/D converter, and the conversion characteristics (e.g., the impedance and the current of the variable impedance circuits 240 and 260) of the conversion circuit 220 may be controlled based on the digital value.

(Third Modification)

In the embodiment, the output current $I_{OUT}$ is monitored based on the current detection signal $V_{CS}$ on the primary side, but the present disclosure is not limited thereto. A circuit for monitoring the output current $I_{OUT}$ is installed on the secondary side of the DC/DC converter 200, a detection signal indicating the monitoring result may be transmitted to the primary side using a photocoupler different from the photocoupler 204 so that the conversion characteristics of the conversion circuit 220 may be changed based on the detection signal.

According to the present disclosure in some embodiments, it is possible to reduce the power consumption at a light load.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An isolated DC/DC converter, comprising:
   a transformer having a first winding and a secondary winding;
   a switching transistor connected to the primary winding of the transformer;
   a rectifier element connected to the secondary winding of the transformer;
   a photocoupler;
   a feedback circuit configured to drive a light emitting element on an input side of the photocoupler by a forward current corresponding to an error between an output voltage of the DC/DC converter and a target voltage of the DC/DC converter;
   a conversion circuit configured to convert a collector current flowing in a light receiving element on an output side of the photocoupler into a feedback voltage having a negative correlation with the collector current;
   a pulse signal generator configured to generate a pulse signal corresponding to the feedback voltage; and
   a driver configured to drive the switching transistor depending on the pulse signal,
   wherein the conversion circuit is configured to change conversion characteristics from the collector current to the feedback voltage based on an output current of the DC/DC converter.

2. The converter of claim 1, further comprising a current sense resistor installed in series with the switching transistor,
   wherein the conversion characteristics are controlled based on a voltage drop of the current sense resistor.

3. The converter of claim 2, further comprising a load monitoring circuit including a first comparator configured to compare the voltage drop of the current sense resistor with a threshold value, the load monitoring circuit being configured to control the conversion characteristics depending on an output of the first comparator.

4. The converter of claim 3, wherein the load monitoring circuit further includes a timer circuit whose output is changed for a certain period of time using an output of the first comparator as a trigger,
   wherein the conversion characteristics are controlled depending on the output of the timer circuit.

5. The converter of claim 4, wherein the timer circuit comprises:
   a capacitor connected to the output of the first comparator;
   a resistor or a current source configured to charge the capacitor; and
   a second comparator configured to compare a voltage of the capacitor with a determination reference value,
   wherein the conversion characteristics are controlled depending on an output of the second comparator.

6. The converter of claim 1, wherein an emitter of the light receiving element of the photocoupler is grounded,
   wherein the conversion circuit includes a variable impedance circuit installed between a collector of the light receiving element of the photocoupler and a reference voltage line, the conversion circuit being configured such that impedance of the variable impedance circuit is variable depending on the output current.

7. The converter of claim 6, wherein the variable impedance circuit includes:
   a first resistor installed between the collector of the light receiving element of the photocoupler and the reference voltage line; and
   a second resistor and a switch installed in series between both ends of the first resistor,
   wherein the variable impedance circuit is configured such that ON/OFF of the switch is switchable depending on the output current.

8. The converter of claim 1, wherein the conversion circuit includes:
   a feedback terminal at which the feedback voltage is generated;
   a resistor installed between the feedback terminal and a reference voltage line;
   a first transistor whose collector/drain is connected to the feedback terminal, emitter/source is grounded, and base/gate is connected to an emitter of the light receiving element of the photocoupler; and a variable impedance circuit installed between the base/gate of the first transistor and a ground, wherein the conversion circuit is configured such that impedance of the variable impedance circuit is variable depending on the output current.

9. The converter of claim 8, wherein the variable impedance circuit includes a variable current source configured to sink a correction current corresponding to the output current from the base/gate of the first transistor.

10. The converter of claim 1, wherein the conversion characteristics are discretely changed based on a comparison result between the output current and at least one threshold value.

11. The converter of claim 1, wherein the conversion characteristics are continuously changed depending on the output current.

12. An electronic device, comprising:
a load;
a diode rectifier circuit configured to full-wave rectify a commercial AC voltage;
a smoothing capacitor configured to smooth an output voltage of the diode rectifier circuit to generate a DC input voltage; and
the DC/DC converter of claim 1, configured to step down the DC input voltage for supply to the load.

13. A power adaptor, comprising:
a diode rectifier circuit configured to full-wave rectify a commercial AC voltage;
a smoothing capacitor configured to smooth an output voltage of the diode rectifier circuit to generate a DC input voltage; and
the DC/DC converter of claim 1, configured to step down the DC input voltage for supply to a load.

14. A primary side controller for use in an isolated DC/DC converter including a transformer having a first winding and a secondary winding; a switching transistor connected to the primary winding of the transformer; a rectifier element connected to the secondary winding of the transformer; a photocoupler; and a feedback circuit configured to drive a light emitting element on an input side of the photocoupler by a forward current corresponding to an error between an output voltage of the DC/DC converter and a target voltage of the DC/DC converter, the primary side controller comprising:
a conversion circuit configured to convert a collector current flowing in a light receiving element on an output side of the photocoupler into a feedback voltage having a negative correlation with the collector current;
a pulse signal generator configured to generate a pulse signal corresponding to the feedback voltage; and a driver configured to drive the switching transistor depending on the pulse signal, wherein the conversion circuit is configured to change conversion characteristics from the collector current to the feedback voltage based on an output current of the DC/DC converter.

15. The controller of claim 14, wherein the DC/DC converter further includes a current sense resistor installed in series with the switching transistor, wherein the conversion characteristics are controlled based on a voltage drop of the current sense resistor.

16. The controller of claim 15, further comprising a load monitoring circuit including a first comparator configured to compare the voltage drop of the current sense resistor with a threshold value, the load monitoring circuit being configured to control the conversion characteristics depending on an output of the first comparator.

17. The controller of claim 16, wherein the load monitoring circuit further includes a timer circuit whose output is changed for a certain period of time using an output of the first comparator as a trigger, and wherein the conversion characteristics are controlled depending on an output of the timer circuit.

18. The controller of claim 17, wherein the timer circuit comprises:
a capacitor connected to the output of the first comparator;
a resistor or a current source configured to charge the capacitor; and
a second comparator configured to compare a voltage of the capacitor with a determination reference value,
wherein the conversion characteristics are controlled depending on an output of the second comparator.

19. The controller of claim 14, wherein an emitter of the light receiving element of the photocoupler is grounded, wherein the conversion circuit includes a variable impedance circuit installed between a collector of the light receiving element of the photocoupler and a reference voltage line, the conversion circuit being configured such that impedance of the variable impedance circuit is variable depending on the output current.

20. The controller of claim 19, wherein the variable impedance circuit includes:
a first resistor installed between the collector of the light receiving element of the photocoupler and the reference voltage line; and
a second resistor and a switch installed in series between both ends of the first resistor,
wherein the variable impedance circuit is configured such that ON/OFF of the switch is switchable depending on the output current.

* * * * *